Figures 1, 2:
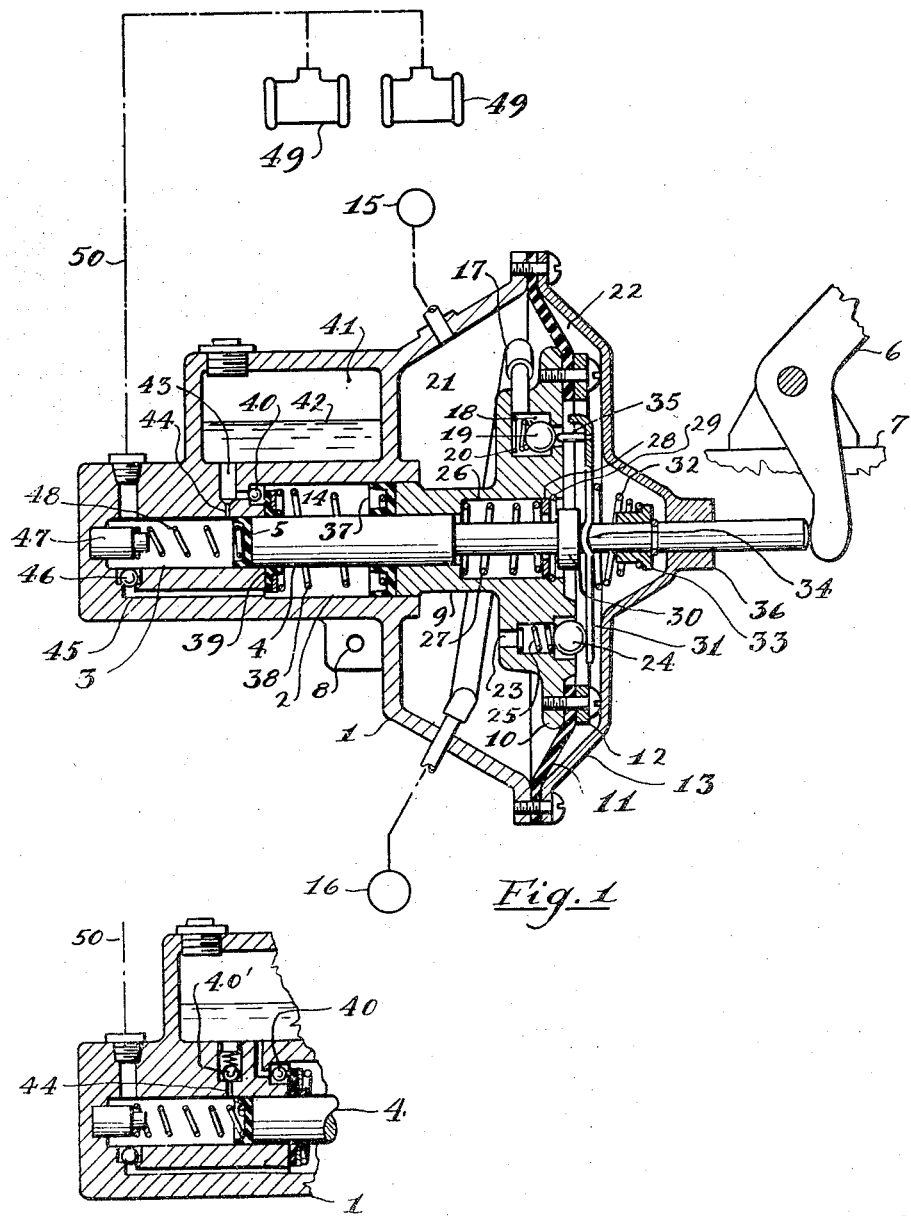

Jan. 11, 1949.  W. STELZER  2,458,803
COMBINED POWER AND MANUALLY OPERATED BRAKE BOOSTER
Filed June 24, 1943  2 Sheets-Sheet 1

INVENTOR.
William Stelzer

Patented Jan. 11, 1949

2,458,803

UNITED STATES PATENT OFFICE 2,458,803

COMBINED POWER AND MANUALLY OPERATED BRAKE BOOSTER

William Stelzer, East Orange, N. J.

Application June 24, 1943, Serial No. 492,108

7 Claims. (Cl. 60—54.5)

The invention relates to combined power and manually operated brake boosters and more particularly to a booster for a hydraulic braking system where the usual master cylinder or pressure producing device is incorporated in the booster unit.

It is well known that in conventional hydraulic brake systems the displacement of fluid after a high pressure is reached is very small, whereas at the beginning of the brake application when the pressure required is low the volume of fluid displaced to expand the brake shoes is considerable and varies depending on the adjustment of the clearance between the lining and the drum.

In order to transmit the necessary fluid to the wheel cylinders quickly, I have provided power means which are applied upon depression of the brake pedal by the operator, and which produce a fluid pressure sufficient to apply the brakes. To obtain a quick stop requiring maximum hydraulic pressures a second stage piston is provided which takes over after the lower pressure has reached its maximum with the available power, the second stage piston producing a peak pressure transmitted to the wheel cylinders without appreciably increasing the displacement of the latter.

The object of the invention is to produce a simplified booster system lending itself particularly for use with passenger cars where a construction is required that can be manufactured cheaply without sacrificing any advantages.

Another object is to obtain a pressure producing unit that is compact in construction, by utilizing a power booster of minimum size and providing special means for producing peak pressures.

A further object is to provide means to apply the brakes more quickly than this has been accomplished heretofore, to increase the safety of the brakes.

It is also the aim of this invention to decrease the required brake pedal travel by providing a power booster and a two stage pressure producing device.

Figure 3:
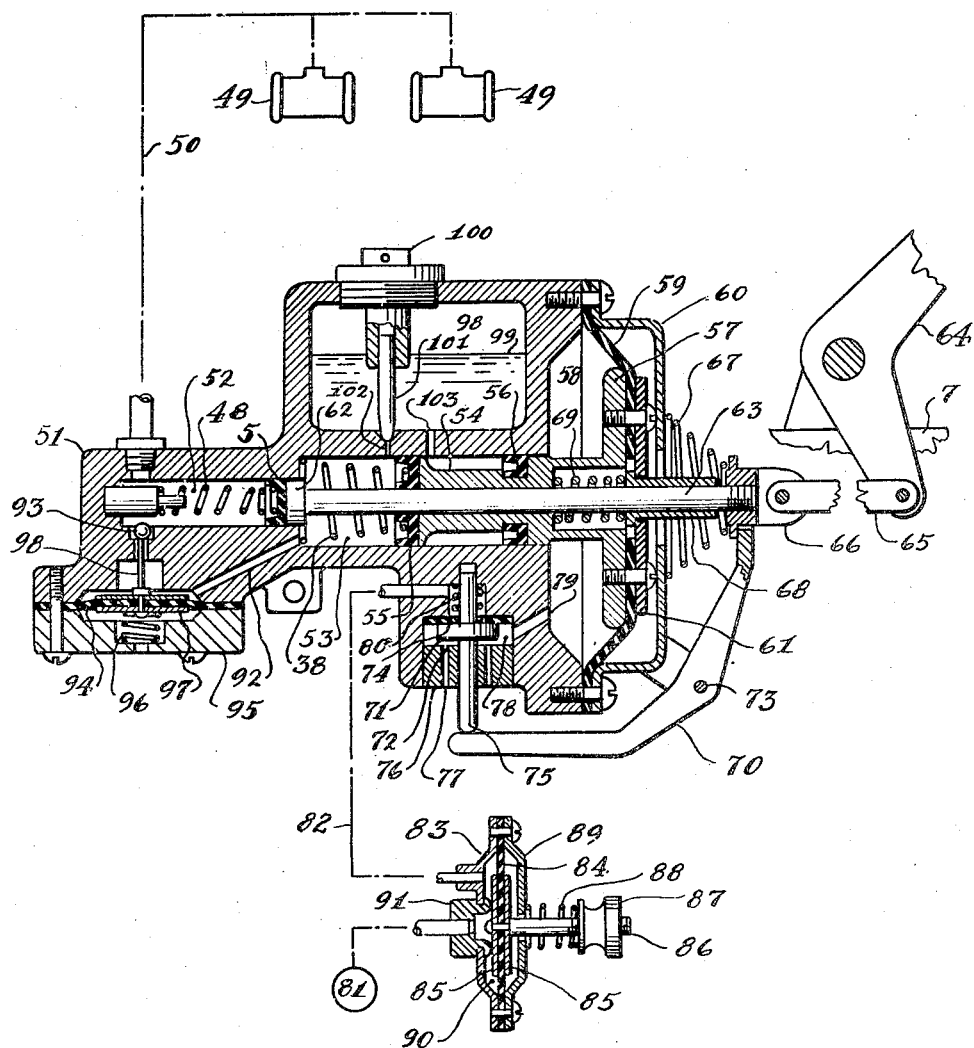

Other objects and advantages of the invention will be apparent from the following detailed description considered in connection with the accompanying drawings submitted for the purpose of illustration and not intended to define the scope of the invention, reference being had for that purpose to the subjoined claims. In the drawings, wherein similar reference characters refer to similar parts throughout the several views:

Fig. 1 is a sectional elevation of the improved hydraulic brake booster shown connected diagrammatically to a hydraulic braking system;

Fig. 2, a fragmentary sectional elevation of the device shown in Fig. 1, illustrating an optional construction;

Fig. 3, a sectional elevation of the improved hydraulic booster showing a modified construction, also shown connected diagrammatically to a hydraulic braking system.

Before explaining in detail the present invention it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not limitation.

Describing the invention now in detail, and referring to Fig. 1, there is shown a hydraulic brake booster unit serving as master cylinder also, and comprising a housing 1 having an auxiliary cylinder bore 2 in which the lower or primary stage pressure is produced, and a bore 3 in which the peak pressure is produced by means of plunger 4 having a seal 5 and being actuated by the conventional brake pedal 6 pivotally mounted to a structural member 7 of the vehicle, to which housing 1 may also be secured, as for instance at 8. Cylinder bore 2 accommodates power piston 9 whose larger end serves as a diaphragm plate 10 for diaphragm 11 clamped thereto by means of ring 12, whereas the outer edge is clamped to housing 1 by means of cover 13. The enlarged end of housing 1, piston plate 10, diaphragm 11, and cover plate 13 form the main elements of an expansible chamber motor mechanism which furnishes the power to produce a hydraulic pressure in chamber 14. The source of power consists of a source of lower pressure 15 and a source of higher pressure 16. 15 is preferably vacuum as received from the intake manifold of an internal combustion engine, and 16 atmospheric pressure. From the latter a flexible hose connection 17 leads to valve chamber 18 housing a ball 19 urged against its seat by a light spring 20. Low pressure source 15 is connected to chamber 21 of the expansible chamber motor mechanism and its pressure is communicated to chamber 22 via passage 23 past valve ball 24 urged away from its seat by a spring 25.

Piston 9 and plunger 4 are co-axial and adapted so that the latter slides within piston 9 which also has a bore 26 housing a spring 27 held by a pickup ring 28 retained by a snap ring 29. Plunger 4 has a collar 30 against which valve actuating plate 31 is pressed by means of a conical spring 32 resting against collar 33 secured to plunger 4. Plate 31 merely serves as a double-armed lever fulcrumed at 34 and having a pin 35 serving to unseat ball 19. It is immaterial what shape plate 31 may have, but the central portion should have a hole through which the reduced end of plunger 4 may pass. The latter is guided in bearing or hub 36 of cover 13.

Piston 9 has a seal 37 retained by a spring 38 which urges piston 9 into its "off" or idle position and also keeps seal 39 in a seated position. Check valve 40 checks the flow of fluid from chamber 14 to reservoir 41, where line 42 indicates the fluid level, but it permits the flow of fluid from 41 to chamber 14 through passage 43. A small hole 44 is in communication with bore 3. It is placed to be near seal 5 when the booster is in the "off" position. A passage 45 leads from chamber 14 to check valve 46 which checks the flow of fluid from bore 3 to chamber 14 but permits the flow of fluid vice versa. This check valve consists of a ball retained by a plug 47 also serving as a seat for return spring 48. Bore 3 is in communication with wheel cylinders 49 through fluid pressure transmitting line 50.

As illustrated in Fig. 2, a relief valve 40' backed by a light spring may be used to close off port 44 in order to maintain a certain minimum pressure in the hydraulic circuit so that no air can enter the system.

In the modification shown in Fig. 3 the pressure producing device or booster unit comprises a housing 51 having a high pressure chamber 52 and a co-axial auxiliary chamber 53 in which slides a power operated piston 54 provided with seals 55 and 56 and having a diaphragm plate 57 at one end which serves as a piston of an expansible chamber motor mechanism whose working chamber is designated by numeral 58 and is formed by diaphragm 59 clamped to housing 51 by a cover 60 and to diaphragm plate 57 by a clamping plate 61. In chamber 52 slides a piston 62 having a piston rod 63 operated by manual power through brake pedal 64, link 65, and clevis 66. These manually operated elements are urged in a retractile or "off" position by conical spring 67. A sleeve 68 fits freely on piston rod 63 and is pressed against plate 61 by a spring 69. In the seated position it has a clearance with clevis 66 so that the manually operated elements may be moved a sufficient amount to allow lever 70 to swing a certain distance to allow valve 71 to seat on seat 72 before clevis 66 comes in contact with sleeve 68. Lever or bell crank 70 is pivoted at 73 on a bracket extending from cover 60, and is arranged to hold valve 71 against seat 74 when the brake booster is in the "off" position as shown. For this purpose it presses against valve rod 75 sliding in insert 76 which has holes 77 to admit air to chamber 78 in communication with chamber 58 through passage 79. Valve 71 is urged against seat 72 by a light spring 80 of sufficient strength, however, to overcome the atmospheric pressure tending to keep valve 71 seated on 74, the chamber in which spring 80 acts being open to a source of low pressure or suction 81 through line 82 in which a pressure modulator is interposed. This pressure modulator comprises a housing 83, diaphragm 84, diaphragm plates 85, a piston rod 86 to which is secured an adjusting nut 87 for adjusting modulating spring 88 opposing the atmospheric pressure acting on diaphragm 84, cover 89 serving merely to secure the peripheral surface of diaphragm 84 to housing 83 to form a chamber 90. Fitting 91 serves as a valve seat for diaphragm plate 85 which shuts off the supply of vacuum when the suction in chamber 90 is too great.

In order to transmit the hydraulic fluid from chamber 53 to wheel cylinders 49, a passage 92 and check valve 93 are provided, allowing the flow of fluid via chamber 52. The pressure sensitive device comprising diaphragm 94 secured to housing 51 with cap 95 carrying a spring 96 serves to control check valve 93. Thus when the pressure in chamber 53 is relieved spring 96 acting against diaphragm plate 97 cracks check valve 93 open by means of a piston rod or operating pin 98 secured to said diaphragm plates.

The brake booster unit also comprises a fluid reservoir 98, 99 indicating the fluid level, and 100 being a filler plug whose lower portion carries a valve 101 to close off port hole 102 with a yielding force, governed by its own weight. The purpose of this valve is to maintain a pressure greater than atmosphere to prevent the entry of air into the hydraulic system. Hole 103 provides communication between reservoir 98 and the space between seals 55 and 56 throughout the operation of the booster.

Having thus described the construction I shall now explain the operation of the same. Assuming that the hydraulic braking system illustrated in Fig. 1 is in a released position as shown, and that the operator depresses foot pedal 6 to apply the brakes, piston 4 is moved towards the left to reduce the volume of chamber 3 and thereby force fluid to wheel cylinders or pressure receiving means 49. At the same time, since collar 30 of piston 4 moves to the left, plate or lever 31 moves with it due to the pressure of spring 32, though opposed by springs 20 and 25. The latter being weaker than spring 20, it yields first, allowing ball 24 to seat and to thereby close off the passage between vacuum chamber 21 and working chamber 22. The closing of valve 24, however, does not cause a change in pressure in chamber 22 as its pressure is still the same as that of chamber 21. Further movement of lever 31 towards the left causes spring 20 to be overpowered, whereby valve 19 cracks open. In cracking valve 19 plate 31 rocks on ball 24 because the latter is firmly seated and offers a resistance to further movement. Air is now permitted to flow from 16 through flexible hose 17 past ball 19 into chamber 22 to urge piston plate 10 and hydraulic piston 9 towards the left to travel in unison with piston 4. Valves 19 and 24 are follow-up valves, causing plate 10 to travel at the same speed as piston 4, and regulating the fluid power directed to chamber 22 to accomplish this effect. Taking an example and assuming that plate 10 travels faster than piston 4, plate 31 would become retarded relative to valves 19 and 24. Ball 19 would close first, preventing further flow of fluid power to chamber 22 and retarding plate 10. If the retardation of plate 10 is not sufficient ball 24 becomes unseated to permit relief of pressure from chamber 22 into chamber 21, thus stopping plate 10 entirely or allowing it to return until valve 24 is seated again.

Assuming now that the operator continues to depress pedal 6, movement of auxiliary piston 9 towards the left forces fluid from chamber 14 through passage 45, past check valve 46 and through line 50 to fluid pressure receiving means 49 to apply the brakes. The hydraulic pressure in chambers 3 and 14 are equal. After the operation has reached a stage where full power is applied to the expansible chamber motor mechanism, and where the power cannot be increased further, but pedal 6 is further depressed by the operator with an increased force, piston 4 continues its travel to force fluid to the wheel cylinders 49. Piston 14, however, remains stationary since the expansible chamber motor mechanism is incapable to increase the pressure in chamber 14 further. Consequently, check valve 46 is seated and prevents the higher pressure in chamber 3 to relieve itself into chamber 14. As piston 4 travels towards the left to produce a peak pressure, springs 27 and 32 are compressed. This movement, according to experience, is very small, so that collar 33 never comes in contact with plate 31.

Supposing now that the operator releases pedal 6, piston 4 retracts towards the right due to spring 48 and the hydraulic pressure in chamber 3, on its way picking up plate 31 to allow valve 19 to close and 24 to open to relieve the pressure in chamber 22 so that piston 9 retracts in unison, helped by spring 38. A sucking action takes place in chamber 14 during the retractile movement, drawing fluid from reservoir 41. It will be noted that no air can enter chamber 14 because chamber 21 is open to vacuum. When pistons 4 and 9 have reached their retracted or "off" position, port 44 is uncovered and the hydraulic fluid returning from wheel cylinders 49 is permitted to escape into reservoir 41.

The device shown in Figure 1 is fully manually operative in the event of a failure of power in the vacuum motor. Assuming that the pedal is operated and the motor does not function, the pedal will move the piston 4 toward the left. This piston will start immediately to displace fluid through the line 50 to the brake cylinders, and very shortly after initial movement starts, the collar 30 will start to load the spring 27.

As is well known, most of the movement of fluid in the brake lines takes place to move the brake shoes into engagement with the drums, after which substantially static pressure is built up to secure the desired brake application. The initial displacement of fluid for the purpose stated takes place against relatively low resistance, and accordingly upon a relatively slight loading of the spring 27, movement will be imparted to the piston 9 to displace fluid from the chamber 14 through passage 45 and thence past check valve 46 into the chamber 3 and on into the brake line 50. Inasmuch as there is a relatively free flow of fluid through the line 50 at this time, pressures will remain relatively equal in the cylinder 3 and chamber 14. Therefore it is necessary merely to build up sufficient loading of the spring 27 to operate the piston 9, whereupon both pistons 4 and 9 will displace fluid into the brake lines 50.

As soon as the brake shoes engage the drums, an immediate increase in pressure occurs in the line 50 and in the cylinder 3, whereupon the check valve 46 closes. Fluid will thereupon be trapped in the chamber 14 and the piston 9 will cease to operate. The spring 27 will not have been compressed to a substantial extent, and accordingly it does not offer high resistance to further manual movement of the piston 4. This piston continues to move by operation of the pedal to build up the necessary braking pressure. It will be apparent, however, that once the brake shoes have been set, the actual displacement of fluid from the cylinder 3 will be negligible in the building up of the necessary static pressure, and accordingly very slight movement of the piston 4 takes place after the brakes have set. Accordingly it will be apparent that due to the low initial pressure in the line 50, the piston 9 operates in the same manner as when the motor functions, it merely being necessary for the operator to exert somewhat greater pressure on the brake pedal.

The operation of the construction shown in Fig. 3 is similar to that of the embodiment shown in Fig. 1 except that the auxiliary piston 54 does not move in unison with piston 62 but travels independently and rapidly to force hydraulic fluid from chamber 53 to wheel cylinders 49 as soon as brake pedal 64 is depressed by the operator and clevis 66 has moved to the left sufficiently to allow lever 70 to turn a short distance until valve disc 71 is seated on 72 by virtue of spring 80 to open the passage between source of vacuum 81 and chamber 58, effecting exhaustion of the latter. The hydraulic pressure in chamber 53 is increased depending on the strength or power of the expansible chamber motor mechanism whose working chamber 58 is connected to the vacuum, the other side of diaphragm 59 being open to atmosphere. The hydraulic pressure produced in chamber 53 also acts on diaphragm 94 causing it to move downwardly against the pressure of spring 96 so that push rod 98 loses contact with ball 93. The force of the expansible chamber motor mechanism is just sufficient to apply the brakes, so that the brake shoes are fully in contact with the brake drums. To accomplish this, the modulator interposed in line 82 keeps the vacuum pressure constant regardless of fluctuations in source 81. Chamber 90 contains the regulated fluid pressure, while the opposite side of diaphragm 84 is open to the atmosphere. Spring 88 is adjusted to yield when the pressure in chamber 90 is too great, to connect the latter to the source of vacuum when diaphragm plate 85 lifts away from seat 91.

Assuming now that the brake shoes have expanded so that the resistance offered the fluid in wheel cylinders 49 is increased and the movement of auxiliary piston 54 consequently arrested, but that pedal 64 is further depressed by the operator, then piston 62 is advanced into chamber 52 to force hydraulic fluid from there to wheel cylinders or hydraulic pressure receiving means 49. Check valve 93 is seated and prevents the flow of fluid from chamber 52 or wheel cylinders 49 to chamber 53. Thus a higher pressure is built up in chamber 52 and wheel cylinders 49. Since the movement of piston 54 was very rapid after pedal 64 was operated, it may have advanced much faster than rod 63, thus establishing a gap or clearance between sleeve 68 and clevis 66. The movement of piston 62 to provide a peak pressure may be smaller than said gap or clearance so that clevis 66 may not come in contact with sleeve 68 at any time during the operation. However, if the movement of brake pedal 6 is very rapid the clearance between clevis 66 and sleeve 68 when piston 54 comes to rest may be small so that upon further depression of pedal 6 spring 69 is compressed, which does not change the operation of the brakes in any manner. The purpose for spring 69 is to serve as means for moving piston 54 in case of failure of the source of power, when piston 54 would be moved by manual power through lever 64, clevis 66, sleeve 68, and spring 60. At a point where the brakes are applied spring 69 would compress and piston 62 advance alone.

Assuming now that the operator releases brake pedal 64, piston 62 is permitted to retract to the "off" position, where clevis 66 actuates lever 70 which raises valve 71 to close off the supply of vacuum and lets air through holes 77 into chamber 58 to equalize the pressures between the two sides of diaphragm 59 whereby auxiliary piston 54 starts its retractile movement while diaphragm 94 due to the relief of pressure in chamber 53 is raised by spring 96 to crack check valve 93 so that hydraulic fluid may return from wheel cylinders 49 to chamber 53. In the "off" position port 102 is uncovered by cup 5 to allow excess pressure to relieve itself into reservoir 101.

Having thus described the invention, I claim:

1. In a hydraulic braking system having actuating cylinders to expand the brake shoes, in combination, a pressure producing device comprising a chamber and a manually operated piston therein to force fluid to said actuating cylinders, an auxiliary piston in a separate chamber to produce a hydraulic pressure, a power motor to operate said auxiliary piston, fluid pressure transmitting means leading from said separate chamber to said actuating cylinders, check valve means interposed in said fluid pressure transmitting means arranged to permit the flow of fluid from said separate chamber to said actuating cylinders but not in the opposite direction, and resilient means interposed between said manually operated piston and said auxiliary piston to tend to operate the latter upon operation of said manually operated piston.

2. In a hydraulic braking system having hydraulic pressure receiving means to actuate the brakes, in combination, a pressure producing device comprising a chamber and a manually operated piston therein to force brake fluid to said fluid pressure receiving means, manual operating means therefor, an auxiliary piston in a separate chamber to produce a hydraulic pressure therein, an expansible chamber motor mechanism to operate said auxiliary piston, fluid pressure transmitting means leading from said separate chamber to said hydraulic pressure receiving means, a check valve interposed in said fluid pressure transmitting means to allow fluid to pass from said separate chamber to said hydraulic pressure receiving means, valve means responsive to the movement of said manual operating means to control said expansible chamber motor mechanism to operate said auxiliary piston, and resilient means interposed between said manually operated piston and said auxiliary piston to tend to operate the latter upon operation of said manually operated piston.

3. In a hydraulic braking system having hydraulic pressure receiving means to actuate the brakes, in combination, a pressure producing device comprising a chamber and a manually operated piston therein to force hydraulic fluid to said hydraulic pressure receiving means, lever means for manually operating said piston, an auxiliary piston in a separate chamber to produce a hydraulic pressure therein, an expansible chamber motor mechanism to operate said auxiliary piston, fluid pressure transmitting means from said separate chamber to said hydraulic pressure receiving means, a check valve interposed in said fluid pressure transmitting means to prevent the return of fluid from said hydraulic pressure receiving means to said separate chamber, a source of power, valve means to direct power to and from said expansible chamber motor mechanism, means responsive to the application of said lever means to operate said valve means to direct power to said expansible chamber motor mechanism, said manually operated piston being capable of continuing its stroke after said auxiliary piston has stopped due to too great resistance, and resilient means interposed between said manually operated piston and said auxiliary piston to tend to operate the latter upon operation of said manually operated piston.

4. In a hydraulic braking system having hydraulic pressure receiving means to actuate the brakes, in combination, a pressure producing device comprising a pressure chamber, a manually operated piston therein to force fluid to said hydraulic pressure receiving means, manually operated lever means to actuate said piston, an auxiliary chamber, a power operated piston in said auxiliary chamber, a check valve intermediate said auxiliary chamber and said pressure chamber arranged to allow flow of fluid from said auxiliary chamber to said pressure chamber but to check the flow of fluid in the opposite direction, yielding means interposed between said manually operated piston and said power operated piston to urge said power operated piston to travel in unison with said manually operated piston, means urging to open said check valve, and means responsive to the hydraulic pressure in said auxiliary chamber to oppose said means that urges to open said check valve, whereby said check valve is opened when the hydraulic pressure in said auxiliary chamber is reduced.

5. In a hydraulic braking system having hydraulic pressure receiving means to apply the brakes, in combination, a pressure producing device comprising a first pressure chamber, a manually operated piston therein, manuually operated means to actuate said piston, an auxiliary pressure chamber in axial alignment with said first pressure chamber, a piston in said auxiliary chamber, a fluid power motor mechanism to actuate said piston in said auxiliary pressure chamber, fluid pressure transmitting means from said auxiliary chamber to said hydraulic pressure receiving means, a check valve interposed to check the flow of fluid from said hydraulic pressure receiving means to said auxiliary pressure chamber, a source of fluid pressure, a valve means to direct fluid pressure to said fluid power motor mechanism, means to open said valve means upon initial actuation of said manually operated means to energize said fluid power motor mechanism to urge said piston in said auxiliary pressure chamber to force hydraulic fluid to said hydraulic pressure receiving means at a rate independent of said manually operated piston, and resilient means interposed between said manually operated means and said second named piston to tend to operate the latter upon operation of said manually operated means.

6. In a hydraulic braking system having wheel cylinders and a manually operable element, a pair of cylinders in axial alinement, a piston operable in each cylinder, said pistons being coaxial and one surrounding the other, the inner piston being of smaller area than the outer piston, means for connecting the cylinder of the smaller piston to said brake cylinders, check valve controlled means for supplying fluid from the cylinder of the larger piston to the brake cylinders, means for positively transmitting movement of said manually operable element to said smaller piston, power means for effecting movement of the larger piston, a control device for said power means operable upon initial operation of said manually operable element, and resilient means arranged to transmit to the larger piston forces delivered to the smaller piston by said manually operable element.

7. Apparatus constructed in accordance with claim 6 wherein said power means comprises a differential fluid pressure motor having a pressure responsive structure, said control device comprising control valves carried by said structure, and lever means for effecting operation of said valves upon initial operation of said manually operable element.

WILLIAM STELZER.

REFERENCES CITED

The following references are of record in the file of this patent:

UNITED STATES PATENTS

| Number | Name | Date |
|---|---|---|
| 1,673,528 | Pigeolot | June 12, 1928 |
| 1,721,213 | Frock | July 16, 1929 |
| 2,006,487 | Sorensen | July 21, 1935 |
| 2,098,666 | La Brie | Nov. 9, 1937 |
| 2,106,758 | Oliver | Feb. 1, 1938 |
| 2,190,238 | Lepersonne | Feb. 13, 1940 |
| 2,263,263 | Dodge | Nov. 18, 1941 |
| 2,282,472 | Herman | May 12, 1942 |
| 2,331,238 | Schnell | Oct. 5, 1943 |
| 2,341,318 | Forbes | Feb. 8, 1944 |
| 2,347,349 | Humphrey | Apr. 25, 1944 |

FOREIGN PATENTS

| Number | Country | Date |
|---|---|---|
| 614,982 | France | Oct. 1, 1926 |
| 782,865 | France | Mar. 25, 1935 |